(12) United States Patent
Sakai et al.

(10) Patent No.: US 9,299,382 B2
(45) Date of Patent: Mar. 29, 2016

(54) METHOD OF MANUFACTURING A GLASS SUBSTRATE FOR A MAGNETIC DISK AND METHOD OF MANUFACTURING A MAGNETIC DISK

(75) Inventors: Hideo Sakai, Shinjuku-ku (JP); Yoshihiro Tawara, Shinjuku-ku (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 13/359,011

(22) Filed: Jan. 26, 2012

(65) Prior Publication Data

US 2012/0196033 A1 Aug. 2, 2012

(30) Foreign Application Priority Data

Jan. 27, 2011 (JP) .................................. 2011-014990

(51) Int. Cl.
 *B24B 37/28* (2012.01)
 *G11B 5/84* (2006.01)
 *B24B 7/22* (2006.01)

(52) U.S. Cl.
 CPC .............. *G11B 5/8404* (2013.01); *B24B 7/228* (2013.01); *B24B 37/28* (2013.01)

(58) Field of Classification Search
 None
 See application file for complete search history.

(56) References Cited

U.S. PATENT DOCUMENTS

| | | | | |
|---|---|---|---|---|
| 4,466,218 A * | 8/1984 | Ottman et al. | | 451/527 |
| 5,964,651 A * | 10/1999 | Hose | | 451/262 |
| 6,095,902 A * | 8/2000 | Reinhardt | | 451/36 |
| 6,236,542 B1 | 5/2001 | Hartog et al. | | |
| 6,290,573 B1 * | 9/2001 | Suzuki | | 451/8 |
| 6,801,396 B1 | 10/2004 | Den Hartog et al. | | |
| 2002/0064620 A1 * | 5/2002 | Mitani et al. | | 428/64.4 |
| 2003/0110803 A1 * | 6/2003 | Saito et al. | | 65/30.14 |
| 2004/0192175 A1 * | 9/2004 | Nakano et al. | | 451/41 |
| 2006/0199045 A1 * | 9/2006 | Kezuka et al. | | 428/848.2 |
| 2007/0145014 A1 | 6/2007 | Nishimoto et al. | | |
| 2011/0240594 A1 | 10/2011 | Hamaguchi et al. | | |
| 2012/0077422 A1 * | 3/2012 | Yoshino | | 451/59 |

FOREIGN PATENT DOCUMENTS

| | | |
|---|---|---|
| JP | 7-240025 A | 9/1995 |
| JP | 2003-173518 A | 6/2003 |
| JP | 2007-191696 A | 8/2007 |
| JP | 2008-094982 A | 4/2008 |
| JP | 2009-131947 A | 6/2009 |
| JP | 2010-080030 A | 4/2010 |
| JP | 2010-170646 A | 8/2010 |

OTHER PUBLICATIONS

Britannica "Aluminosilicate glass" <http://www.britannica.com/EBchecked/topic/17932/aluminosilicate-glass> accessed Jun. 28, 2014.*

Japanese Office Action issued Oct. 20, 2015 for corresponding Japanese Patent Application No. 2012-012285.

* cited by examiner

*Primary Examiner* — Mandy Louie
(74) *Attorney, Agent, or Firm* — Sughrue Mion, PLLC

(57) ABSTRACT

A method of manufacturing a glass substrate for a magnetic disk includes a polishing step of polishing a main surface of a glass substrate by sandwiching the glass substrate between a pair of surface plates each having a polishing pad on its surface and by supplying a polishing liquid containing polishing abrasive particles between the glass substrate and the polishing pads. In the polishing step, the polishing liquid and each polishing pad are adjusted so that the friction coefficient falls in a range of 0.02 to 0.05.

11 Claims, 3 Drawing Sheets

METHOD OF MANUFACTURING A GLASS SUBSTRATE FOR A MAGNETIC DISK AND METHOD OF MANUFACTURING A MAGNETIC DISK

This application is based upon and claims the benefit of priority from Japanese patent application No. 2011-014990, filed on Jan. 27, 2011, the disclosure of which is incorporated herein in its entirety by reference.

TECHNICAL FIELD

This invention relates to a method of manufacturing a glass substrate for a magnetic disk adapted to be mounted in a magnetic disk device such as a hard disk drive (HDD) and further relates to a method of manufacturing the magnetic disk. Hereinafter, a glass substrate for a magnetic disk may also be referred to as a magnetic disk glass substrate.

BACKGROUND ART

As an information recording medium adapted to be mounted in a magnetic disk device such as a hard disk drive (HDD), there is a magnetic disk. The magnetic disk is produced by forming a thin film such as a magnetic layer on a substrate and, conventionally, an aluminum substrate has been used as such a substrate. Recently, however, in response to the pursuit of higher recording density, the occupation ratio of glass substrates, which can shorten the distance between a magnetic head and a magnetic disk as compared with the aluminum substrate, has been gradually increasing. In order to minimize the flying height of the magnetic head, a glass substrate surface is precisely polished, thereby achieving higher recording density. In recent years, the demand for an increase in HDD recording capacity and a reduction in HDD price has been increasing more and more. In order to achieve this, higher quality and lower cost are required also for magnetic disk glass substrates.

High smoothness of a magnetic disk surface is essential for a reduction in the flying height of a magnetic head which is necessary for achieving higher recording density as described above. In order to obtain the high smoothness of the magnetic disk surface, a highly smooth substrate surface is, after all, required and thus it is necessary to precisely polish a glass substrate surface.

A conventional glass substrate polishing method is carried out using polyurethane-based polisher polishing pads while supplying a slurry (polishing liquid) containing a polishing abrasive of metal oxide such as cerium oxide or colloidal silica. A glass substrate with high smoothness can be obtained, for example, by polishing using a cerium oxide-based polishing abrasive and then by finish polishing (mirror polishing) using colloidal silica abrasive particles. Herein, for example, it is proposed to use a colloidal silica slurry, which is pH-adjusted to be acidic, for polishing a magnetic disk substrate (see JP-A-H07-240025 (Patent Document 1)). It is also proposed to use a colloidal silica slurry, which is adjusted to have a pH more than 10.2 and not more than 12 by adding alkali to a polishing liquid, for polishing a magnetic disk glass substrate (see JP-A-2003-173518 (Patent Document 2)).

SUMMARY OF THE INVENTION

In a current HDD, it is possible to achieve a recording density as high as about 500 Gbit/inch$^2$ and, for example, it is possible to store information of about 320 GB in a 2.5-inch (diameter: 65 mm) magnetic disk. However, there has been a demand for achieving still higher recording density, for example, 375 to 500 GB and further 1 TB per disk. Following such a demand for higher HDD capacity in recent years, the requirement for an improvement in substrate surface quality has become stricter than before. In the case of a next-generation substrate for a magnetic disk of, for example, 375 to 500 GB as described above, the substrate largely affects media characteristics and, therefore, a further improvement from a current product is required not only in terms of the roughness of a substrate surface, but also in terms of the absence of a surface defect such as a scratch.

The reason that the next-generation substrate largely affects the media characteristics is as follows:

A significant reduction in the flying height of a magnetic head (distance between the magnetic head and a surface of a medium (magnetic disk)) is pointed out. Since this makes the distance between the magnetic head and a magnetic layer of the medium shorter, it is possible to pick up even a signal of a smaller magnetic particle and thus to achieve higher recording density. In recent years, the magnetic head has a function called DFH (Dynamic Flying Height) for the purpose of achieving a further reduction in flying height than before. Specifically, the magnetic head is provided with a heating portion such as an extremely small heater in the vicinity of a recording/reproducing element portion, thereby protruding only an area around and including the recording/reproducing element portion toward the medium surface. In future, it is expected that, with this DFH function, the distance between the element portion of the magnetic head and the medium surface will be as extremely small as less than 2 nm. Under these circumstances, if an extremely small surface defect such as a scratch, which did not arise as a problem conventionally, is present on a substrate surface while the average roughness of the substrate surface is extremely small, both sides of the scratch of the substrate surface may rise even on the medium surface, and therefore, the possibility of collision with the magnetic head increases. Further, since the distance between the magnetic layer of the medium and the element portion of the magnetic head becomes large at a bottom (valley) portion of the scratch, error tends to occur in reading or writing a magnetic signal.

In the meantime, a slurry mixed with a polishing abrasive of metal oxide such as cerium oxide or colloidal silica and the quality of a glass substrate after polishing have a strong mutual relationship. For example, it is well known that, by controlling the particle size of the polishing abrasive contained in the slurry, the quality of a main surface of the glass substrate is effectively improved. According to a study by the present inventor, by controlling the particle size of the polishing abrasive contained in the slurry, for example, by the use of a polishing abrasive in the form of fine particles, the roughness of the main surface of the substrate can be reduced, while if the particles are too fine, there arises a problem such that the surface roughness increases conversely, that the end face shape is degraded, or that the polishing rate decreases. Further, only with the reduction in size of the polishing abrasive, the effect of the improvement in surface defect such as scratch is not obtained so much.

Naturally, the current requirement for the substrate surface quality can be by and large satisfied by the conventional improvement technique described above. However, the requirement for the improvement in substrate surface quality following the demand for higher HDD capacity in recent years has become stricter than before so that there is a limit in achieving a further improvement in substrate surface quality by the conventional improvement technique.

This invention has been made for solving the above-mentioned problem and has an object to provide a magnetic disk glass substrate manufacturing method which, while maintaining the high polishing rate and enabling a further reduction in the occurrence of surface defects such as scratches as compared with the conventional method, is capable of manufacturing, at a low cost, a high-quality glass substrate that can be used as a next-generation substrate of which the requirement for the substrate surface quality is still stricter than the current requirement, and further to provide a method of manufacturing a magnetic disk using the glass substrate obtained by such a magnetic disk glass substrate manufacturing method.

In order to solve the above-mentioned problem, the present inventor has paid attention to the friction coefficient between a glass substrate and a polishing pad in polishing, which has not been fully studied before. Normally, when the friction between the glass substrate and the polishing pad is large during polishing, the occurrence of surface defects such as scratches becomes significant, while, when the friction between the glass substrate and the polishing pad is small during polishing, the occurrence of surface defects such as scratches is reduced, but the polishing rate becomes low, so that the occurrence of surface defects such as scratches and maintaining the high polishing rate are in a trade-off relationship. As a result of an intensive study, the present inventor has found that, surprisingly, if the friction coefficient between the glass substrate and the polishing pad in polishing is adjusted in a predetermined range, it is possible to further reduce the occurrence of surface defects such as scratches as compared with the conventional method and further to maintain the high polishing rate without a reduction in polishing rate.

Specifically, this invention has the following structures.

(Structure 1)

A method of manufacturing a glass substrate for a magnetic disk, comprising:

a polishing step of polishing a main surface of a glass substrate by sandwiching the glass substrate between a pair of surface plates each having a polishing pad on a surface and by supplying a polishing liquid containing polishing abrasive particles between the glass substrate and the polishing pad, wherein, in the polishing step, the polishing liquid and the polishing pad are adjusted so that a friction coefficient falls in a range of 0.02 to 0.05 where the friction coefficient is a value obtained by dividing, by a load A of 200 g, a frictional force which is measured when the glass substrate is fixed while the polishing pad is rocked in an in-plane direction of the glass substrate at 20 mm/sec in a state where the polishing pad is pressed with the load A onto the main surface of the glass substrate and where the polishing liquid is supplied between the glass substrate and the polishing pad.

(Structure 2)

The method according to the structure 1, wherein the friction coefficient is adjusted by adding a polymer containing a sulfonic group to the polishing liquid.

(Structure 3)

The method according to the structure 2, wherein the content of the polymer containing the sulfonic group in the polishing liquid is in a range of 0.01 to 1 wt %.

(Structure 4)

The method according to the structure 2 or 3, wherein the polymer containing the sulfonic group is an acrylic-based polymer containing a sulfonic group.

(Structure 5)

The method according to any one of the structures 1 to 4, wherein the polishing abrasive particles are colloidal silica having a particle size of 10 to 40 nm.

(Structure 6)

The method according to any one of the structures 1 to 5, wherein a suede pad is used as the polishing pad.

(Structure 7)

The method according to the structure 6, wherein a polishing pad with an Asker C hardness of 70 or more and 80 or less is used as the polishing pad.

(Structure 8)

The method according to any one of the structures 1 to 7, wherein the glass substrate is made of an amorphous aluminosilicate glass.

(Structure 9)

A method of manufacturing a magnetic disk, comprising:

forming at least a magnetic layer on the magnetic disk glass substrate obtained by the method according to any one of the structures 1 to 8.

According to this invention, while maintaining the high polishing rate, it is possible to manufacture, at a low cost, a high-quality magnetic disk glass substrate with less surface defects such as scratches than a conventional product. The magnetic disk glass substrate obtained by this invention can be suitably used particularly as a next-generation substrate of which the requirement for the substrate surface quality is still stricter than the current requirement. Further, using the glass substrate obtained by this invention, it is possible to obtain a highly reliable magnetic disk which can operate stably over a long period of time even when combined with an extremely low flying height-designed magnetic head having a DFH function.

DESCRIPTION OF THE INVENTION

Figure 1:
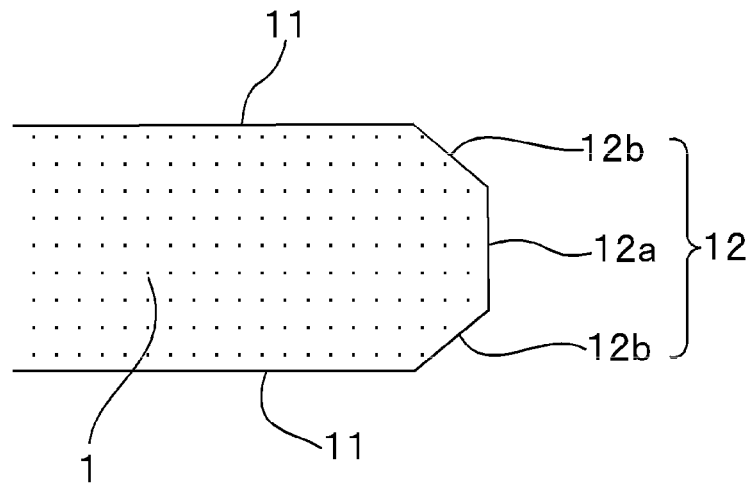
FIG. 1 is a cross-sectional view of a magnetic disk glass substrate.

Hereinbelow, an embodiment of this invention will be described in detail.

Normally, a magnetic disk glass substrate is manufactured through a rough grinding process (rough lapping process), a shaping process, a precision grinding process (precision lapping process), an end face polishing process, a main surface polishing process (first and second polishing processes), and a chemical strengthening process.

In the manufacture of the magnetic disk glass substrate, first, a molten glass is molded into a disk-shaped glass substrate (glass disk) by direct pressing. Alternatively, a plate glass may be manufactured by a downdraw method or a float method and then cut into a disk-shaped glass substrate (glass disk) with a predetermined size. Then, this molded glass substrate (glass disk) is ground (lapped) for improving the dimensional accuracy and shape accuracy thereof. In this grinding process, using normally a double-side lapping machine, main surfaces of the glass substrate are ground by the use of hard abrasive particles such as diamond abrasive particles. By grinding the main surfaces of the glass substrate in this manner, the glass substrate is machined to a predetermined thickness, flatness, and surface roughness.

After the completion of the grinding process, mirror polishing is carried out for obtaining a high-precision flat surface. Preferably, a glass substrate mirror-polishing method is carried out using polishing pads such as polyurethane polishing pads while supplying a slurry (polishing liquid) containing a polishing abrasive of metal oxide such as cerium oxide or colloidal silica.

As in the structure 1 described above, this invention provides a method of manufacturing a glass substrate for a magnetic disk, comprising:

a polishing step of polishing a main surface of a glass substrate by sandwiching the glass substrate between a pair of surface plates each having a polishing pad on a surface and by supplying a polishing liquid containing polishing abrasive particles between the glass substrate and the polishing pad, wherein, in the polishing step, the polishing liquid and the polishing pad are adjusted so that a friction coefficient falls in a range of 0.02 to 0.05 where the friction coefficient is a value obtained by dividing, by a load A of 200 g, a frictional force which is measured when the glass substrate is fixed while the polishing pad is rocked in an in-plane direction of the glass substrate at 20 mm/sec in a state where the polishing pad is pressed with the load A onto the main surface of the glass substrate and where the polishing liquid is supplied between the glass substrate and the polishing pad.

A polishing liquid conventionally used in polishing is basically a combination of a polishing abrasive and water as a solvent and further contains a pH adjusting agent for adjusting the pH of the polishing liquid and other additives if necessary.

In this invention, by adjusting the friction coefficient between the glass substrate and each polishing pad, which is defined according to this invention, to the predetermined range, the friction between the glass substrate and each polishing pad in polishing is suitably reduced so that not only the effect of reducing the roughness of the substrate surface, but also particularly the effect of reducing surface defects such as concave defects due to scratches on the substrate surface are large. Further, the high polishing rate can be maintained without a reduction in polishing rate and thus, according to this invention, it is possible to solve the trade-off problem between the occurrence of surface defects such as scratches and maintaining the high polishing rate. As a consequence, it is possible to manufacture, at a low cost, a high-quality magnetic disk glass substrate with less surface defects such as scratches than a conventional product. Herein, the scratch which is at issue in this invention is a very small scratch having, for example, a width and length of 50 nm or less and a depth of 5 nm or less. If such a fine scratch is present on the substrate surface, a defect appears on a surface of a magnetic disk obtained by depositing a magnetic film and so on the substrate. Thus, presence of the fine scratch affects the protruding amount of a DFH head.

It is, however, difficult to directly measure the friction coefficient between the glass substrate and the polishing pad in polishing and, therefore, in this invention, the friction coefficient is defined as a value obtained by dividing, by a load A of 200 g, a frictional force which is measured when the glass substrate is fixed while the polishing pad is rocked in an in-plane direction of the glass substrate at 20 mm/sec in a state where the polishing pad is pressed with the load A onto the main surface of the glass substrate and where a polishing liquid is supplied between the glass substrate and the polishing pad. Then, the polishing step is carried out using the polishing liquid and the polishing pads which are adjusted so that the friction coefficient falls in the range of 0.02 to 0.05. This makes it possible to adjust the above-mentioned friction coefficient between the glass substrate and each polishing pad in polishing to the suitable predetermined range.

Specifically, in this invention, the above-mentioned friction coefficient is defined as a numerical value obtained by the following measurement method.

Figure 4A:
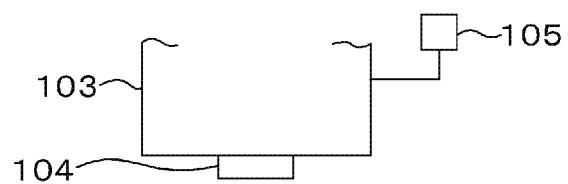
FIGS. 4A and 4B are views for explaining a method of measuring the friction coefficient between a polishing pad and a glass substrate in this invention.
Figure 4B:
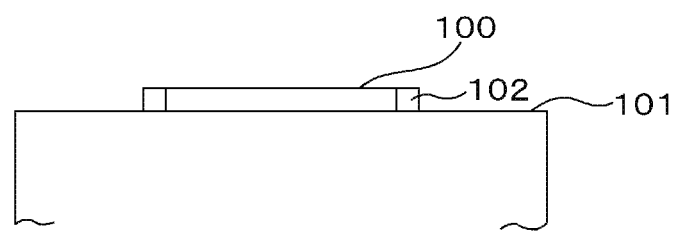
Figure 4B:
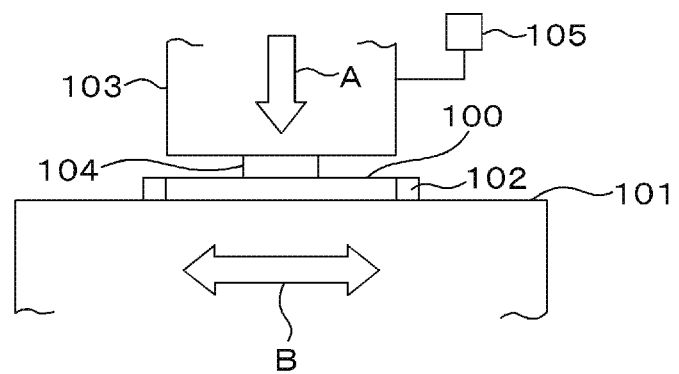

FIGS. 4A and 4B are views for explaining a method of measuring the friction coefficient between the polishing pad and the glass substrate in this invention. As shown in FIG. 4A, a glass substrate 100 is fixed, by means of a fixture 102, at a predetermined position on a movable stage 101 which is configured to be rockable in the horizontal direction, while, a polishing pad 104 is fixed (bonded) to a lower surface of a fixing stage 103 disposed above the movable stage 101. The fixing stage 103 is configured to be movable downward and upward at the same horizontal position. Then, a polishing liquid for use in polishing is dropped on a surface of the glass substrate 100 fixed on the movable stage 101 and, as shown in FIG. 4B, the fixing stage 103 disposed above is moved downward so that the polishing pad 104 is brought into contact with the glass substrate 100. In this event, a predetermined load is applied to the fixing stage 103 in an illustrated arrow A direction. Then, in the state where the glass substrate 100 and the polishing pad 104 are in contact with each other under the predetermined load, the movable stage 101 is rocked a predetermined number of times laterally, i.e. in an illustrated arrow B direction. In this event, resistance values detected by a strain gauge 105 connected to the fixing stage 103 are collected as frictional forces. Then, a value obtained by dividing each frictional force by the applied load is calculated as a friction coefficient. In this invention, the applied load is 200 g, the rocking speed of the movable stage 101 is 20 mm/sec, the rocking distance is 20 mm, and the number of times of rocking is 40.

In this invention, as a method of adjusting the above-mentioned friction coefficient, for example, a polymer containing a sulfonic group may be added to the polishing liquid.

The polymer containing the sulfonic group used in this invention is a copolymer containing at least one kind of monomer having a sulfonic group as a monomer component (such monomer may be referred to as a sulfonic acid). As the monomer having a sulfonic group, use may be made of, for example, isoprene sulfonic acid, (meth)acrylamide-2-methylpropane sulfonic acid, styrene sulfonic acid, methallyl sulfonic acid, vinyl sulfonic acid, allylsulfonic acid, and isoamylene sulfonic acid. Preferably, isoprene sulfonic acid or (meth)acrylamide-2-methylpropane sulfonic acid is used.

One kind of the monomer having a sulfonic group may be used alone or two or more kinds thereof may be used in combination.

The addition amount of the polymer containing the sulfonic group in the polishing liquid is required to be such that the above-mentioned friction coefficient is adjusted to the range of 0.02 to 0.05, and is preferably in the range of, for example, 0.01 to 1 wt %.

In this invention, the above-mentioned friction coefficient is preferably adjusted by adding, for example, an acrylic-based polymer containing a sulfonic group as the polymer containing the sulfonic group, to the polishing liquid.

As the acrylic-based polymer containing the sulfonic group for use in this invention, there is preferably cited, for example, a copolymer of acrylic acid and a sulfonic group-containing monomer. As specific examples of the copolymer of the acrylic acid and the sulfonic group-containing monomer, there are cited, for example, Aron A-6016A, Aron A-6012, Aron A-6017, and Aron A-6020 (all are product names: manufactured by Toagosei Co., Ltd.). Among them, Aron A-6016A is particularly preferable because its molecular weight and viscosity are lower than those of the others so that a reduction in polishing rate is smaller as compared with the case where the others are added to the polishing liquid.

The addition amount of the acrylic-based polymer containing the sulfonic group in the polishing liquid is required to be such that the above-mentioned friction coefficient is adjusted to the range of 0.02 to 0.05, and is preferably in a range of, for example, 0.01 to 1 wt %. One kind of the acrylic-based polymers containing the sulfonic group may be used alone or two or more kinds thereof may be used in combination.

If the above-mentioned friction coefficient is less than 0.02, it is possible to reduce particularly the occurrence of surface defects such as scratches, but the friction between the polishing pad and the glass substrate in polishing becomes too small and thus a reduction in polishing rate becomes too large, so that there arises a problem on the production efficiency and cost. On the other hand, if the above-mentioned friction coefficient exceeds 0.05, although it is possible to maintain the high polishing rate, the occurrence of surface defects such as scratches becomes significant. That is, by carrying out the polishing step using the polishing liquid and the polishing pads which are adjusted so that the above-mentioned friction coefficient falls in the range of 0.02 to 0.05 as in this invention, it is first possible to solve the trade-off problem between the reduction in surface defects such as scratches and maintaining the high polishing rate.

In this invention, the polishing liquid containing colloidal silica abrasive particles or the like may be obtained by adding the acrylic-based polymer containing the sulfonic group to pure water, for example, RO water. Herein, the RO water represents RO (reverse osmosis)-treated pure water. It is particularly preferable to use RO-treated and DI-treated (deionized) RO-DI water. This is because the content of impurities such as alkali metal is extremely low and further the content of ions is also low in the RO or RO-DI water.

The polishing liquid which is applied to the polishing step of this invention is, for example, adjusted to the acidic region. For example, the polishing liquid is adjusted to a pH range of 2 to 4 by adding sulfuric acid thereto. The reason that the polishing liquid adjusted to the acidic region is preferably used in this invention is in terms of the productivity and cleanness.

The polishing abrasive particles such as colloidal silica contained in the polishing liquid preferably have an average particle size of about 10 to 100 nm in terms of the polishing efficiency. Particularly, in this invention, polishing abrasive particles contained in a polishing liquid for use in a finish mirror polishing process (later-described second polishing process) preferably have an average particle size of about 10 to 40 nm in terms of further reducing the surface roughness. More preferably, the average particle size is in a range of 10 to 20 nm.

In this invention, the average particle size represents a particle size at a point of 50% of a cumulative curve (hereinafter referred to as a "cumulative average particle size (50% size)") when the cumulative curve is obtained by setting to 100% the total volume of a mass of particles in a particle size distribution measured by a light scattering method. Specifically, in this invention, the cumulative average particle size (50% size) is a value which is obtained by measurement using a particle size/particle size distribution measuring apparatus (Nanotrac UPA-EX150 manufactured by Nikkiso Co., Ltd.).

A polishing method in the polishing step of this invention is not particularly limited. For example, the glass substrate and the polishing pads are brought into contact with each other and, while supplying the polishing liquid containing the polishing abrasive particles, the polishing pads and the glass substrate are moved relative to each other, thereby polishing the surfaces of the glass substrate to mirror surfaces.

Figure 3:
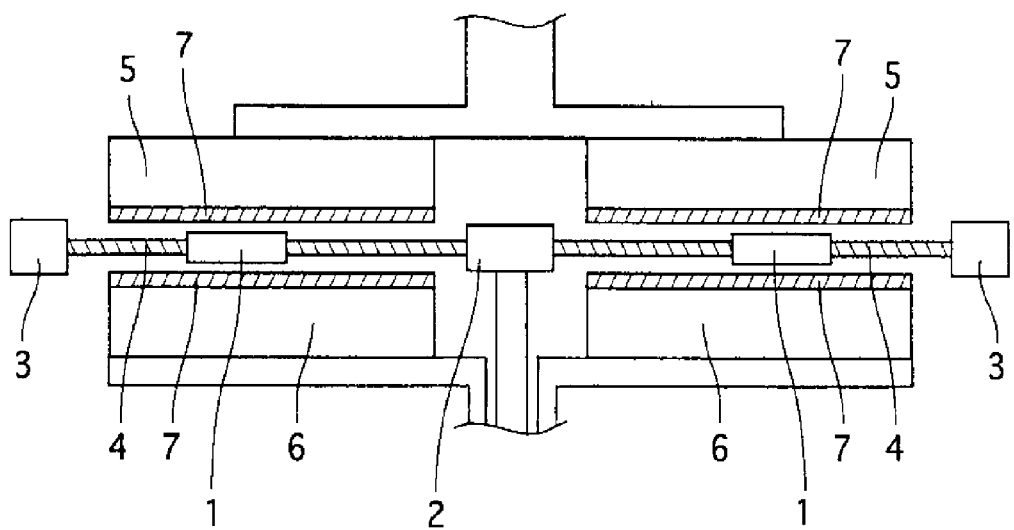
FIG. 3 is a longitudinal sectional view showing a schematic structure of a double-side polishing machine.

For example, FIG. 3 is a longitudinal sectional view showing a schematic structure of a planetary gear type double-side polishing machine which can be used in a mirror polishing process of glass substrates. The double-side polishing machine shown in FIG. 3 comprises a sun gear 2, an internal gear 3 concentrically disposed around the sun gear 2, a carrier 4 meshed with the sun gear 2 and the internal gear 3 and adapted to make an orbital motion while rotating on its axis according to the rotation of the sun gear 2 and the internal gear 3, upper and lower surface plates 5 and 6 respectively bonded with polishing pads 7 which are adapted to hold therebetween workpieces 1 held by the carrier 4, and a polishing liquid supply portion (not illustrated) which supplies a polishing liquid between the upper and lower surface plates 5 and 6.

Using this double-side polishing machine, while polishing, the workpieces 1, i.e. the glass substrates, held by the carrier 4 are pressed between the upper and lower surface plates 5 and 6 and, while supplying the polishing liquid between the polishing pads 7 of the upper and lower surface plates 5 and 6 and the workpieces 1, the carrier 4 makes an orbital motion while rotating on its axis according to the rotation of the sun gear 2 and the internal gear 3, thereby polishing both upper and lower surfaces of the workpieces 1.

The applied load is preferably in a range of about 95 to 135 g/cm$^2$.

As each polishing pad particularly for finish mirror polishing, it is preferable to use a soft-polisher polishing pad (suede pad). The hardness of the polishing pad is preferably 60 or more and 80 or less in Asker C hardness. A contact surface, with the glass substrate, of the polishing pad is preferably a resin foam, particularly a polyurethane foam, with foam pores open. When polishing is carried out in this manner, it is possible to polish the surfaces of the glass substrate to smooth mirror surfaces.

In this invention, it is particularly preferable to use a polishing pad with an Asker C hardness of 70 or more and 80 or less. Using such a high hardness (hard) polishing pad, it is possible to maintain the high polishing rate and further to finish the end portion shape of the main surface of the glass substrate to be flat. However, when polishing is carried out using the high hardness polishing pad, there arise problems such as an increase in fine scratches and a degradation in surface roughness and, therefore, it has been difficult to practically use it as a polishing pad particularly for finish mirror polishing. Accordingly, although there are more or less problems such as a reduction in polishing rate and a degradation in end portion shape, a polishing pad with a relatively low hardness (e.g. less than 60 in Asker C hardness) has been generally used in terms of giving priority to a reduction in fine scratches and an improvement in surface roughness. In this invention, even if such high hardness polishing pads are used in finish mirror polishing, since the polishing step is carried out using the polishing liquid and the polishing pads which are adjusted so that the above-mentioned friction coefficient falls in the range of 0.02 to 0.05 by means of the combination with the polishing liquid which contains, for example, the polymer containing the sulfonic group (such as an acrylic-based polymer containing a sulfonic group), it is possible to reduce the fine scratches and to improve the surface roughness.

In general, a polyurethane polishing pad contains ether-based and ester-based polymers. According to a study by the present inventor, it has been found that if an ether group is contained in polyurethane, it increases the friction with the glass substrate to thereby increase fine scratches. Therefore, it is preferable to use a polyurethane polishing pad which has a low ether group content and preferably contains no ether group. The reason for this is not clear, but according to a conjecture by the present inventor, it is considered that as the ether group content in polyurethane decreases, the diameter of foam pores tends to decrease and thus the density tends to increase, and therefore, the area in contact with the glass substrate increases to enable more uniform polishing.

Normally, the mirror polishing process is carried out through two stages, i.e. a first polishing process for removing cracks or strains remaining in the above-mentioned lapping process and a second polishing process for finishing the main surfaces of the glass substrate to a surface roughness low enough to provide smooth mirror surfaces while maintaining the flat surfaces obtained in the first polishing process (multistage polishing with three or more stages may be carried out). In this case, it is preferable that the polishing step in which the friction coefficient between the polishing pad and the glass substrate, which is defined according to this invention, is adjusted to the predetermined range be applied to at least the later-stage second polishing process. With respect to the initial-stage first polishing process, the conventional polishing method may be applied, but alternatively, the polishing step according to this invention may be applied also to the first polishing process.

In this invention, the type of glass forming the glass substrate is preferably an amorphous aluminosilicate glass. The surfaces of such a glass substrate can be finished to smooth mirror surfaces by mirror polishing and the strength thereof after the processing is excellent. As such an aluminosilicate glass, use can be made of an aluminosilicate glass which is free of phosphorus oxide and contains, as main components, 58 wt % to 75 wt % $SiO_2$, 5 wt % to 23 wt % $Al_2O_3$, 3 wt % to 10 wt % $Li_2O$, and 4 wt % to 13 wt % $Na_2O$. Alternatively, for example, use can be made of an amorphous aluminosilicate glass which is free of phosphorus oxide and contains, as main components, 62 wt % to 75 wt % $SiO_2$, 5 wt % to 15 wt % $Al_2O_3$, 4 wt % to 10 wt % $Li_2O$, 4 wt % to 12 wt % $Na_2O$, and 5.5 wt % to 15 wt % $ZrO_2$, wherein the weight ratio of $Na_2O/ZrO_2$ is 0.5 or more and 2.0 or less and the weight ratio of $Al_2O_3/ZrO_2$ is 0.4 or more and 2.5 or less. The glass is preferably free of alkaline earth metal oxide such as CaO or MgO. As such a glass, there can be cited, for example, N5 Glass (product name) manufactured by HOYA Corporation. Alternatively, a crystallized glass may be used in this invention.

There is a case where heat resistance is required as a property of a next-generation substrate. As a heat-resistant glass in this case, use can be preferably made of, for example, a glass containing 50 mol % to 75 mol % $SiO_2$, 0 to 6 mol % $Al_2O_3$, 0 to 2 mol % BaO, 0 to 3 mol % $Li_2O$, 0 to 5 mol % ZnO, 3 mol % to 15 mol % $Na_2O$ and $K_2O$ in total, 14 mol % to 35 mol % MgO, CaO, SrO, and BaO in total, and 2 mol % to 9 mol % $ZrO_2$, $TiO_2$, $La_2O_3$, $Y_2O_3$, $Yb_2O_3$, $Ta_2O_5$, $Nb_2O_5$, and $HfO_2$ in total, wherein the mole ratio of [(MgO+CaO)/(MgO+CaO+SrO+BaO)] is in a range of 0.85 to 1 and the mole ratio of [$Al_2O_3$/(MgO+CaO)] is in a range of 0 to 30.

In this invention, the surface of the glass substrate after the above-mentioned mirror polishing is preferably a mirror surface with an arithmetic average roughness Ra of 0.20 nm or less, particularly 0.15 nm or less, and further with a maximum roughness Rmax of 2.0 nm or less. In this invention, Ra and Rmax each represent a roughness which is calculated according to the Japanese Industrial Standard (WS) B 0601.

From a practical point of view, in this invention, the surface roughness (e.g. the maximum roughness Rmax, the arithmetic average roughness Ra) is preferably a surface roughness of a surface shape which is obtained by measuring a 1 µm×1 µm square area with a resolution of 512×256 pixels using an atomic force microscope (AFM).

In this invention, it is preferable to carry out chemical strengthening treatment before or after the mirror polishing process. As a method for the chemical strengthening treatment, it is preferable to use, for example, a low-temperature ion-exchange method which performs ion exchange in a temperature range not exceeding the glass transition point, for example, at a temperature of 300° C. or more and 400° C. or less. The chemical strengthening treatment is a treatment in which the glass substrate is brought into contact with a molten chemical strengthening salt so that alkali metal element ions having a relatively small ionic radius in the glass substrate are ion-exchanged with alkali metal element ions having a relatively large ionic radius in the chemical strengthening salt, thereby penetrating the alkali metal element ions having the relatively large ionic radius into a surface layer of the glass substrate to generate compressive stress on the surfaces of the glass substrate. Since the chemically strengthened glass substrate is excellent in impact resistance, it is particularly suitable for mounting in an HDD for mobile use, for example. As the chemical strengthening salt, an alkali metal nitrate such as potassium nitrate or sodium nitrate can be preferably used.

It is preferable to apply the polishing step according to this invention particularly to mirror polishing after the chemical strengthening treatment. According to this invention, since it is possible to reduce surface defects such as fine scratches while maintaining the high polishing rate, it is particularly suitable for main surface mirror polishing of a glass substrate having a high fracture toughness (Klc≥0.9) such as a chemically strengthened amorphous aluminosilicate glass or aluminosilicate-based crystallized glass.

Figure 2:
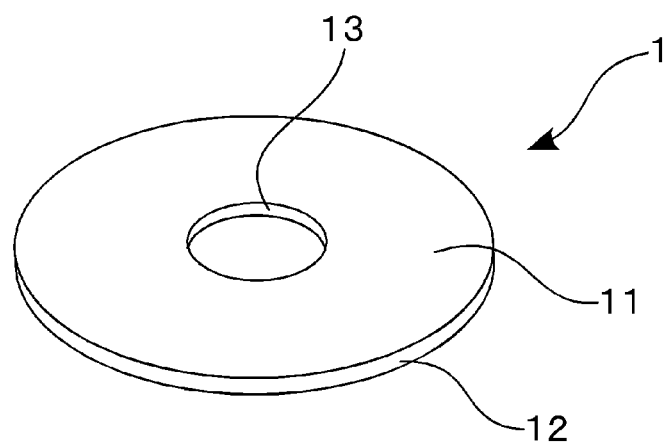
FIG. 2 is an overall perspective view of the magnetic disk glass substrate.

According to the magnetic disk glass substrate manufacturing method of this invention, as shown in FIGS. 1 and 2, there is obtained a disk-shaped glass substrate 1 having main surfaces 11 and 11 and, between them, an outer peripheral end face 12 and an inner peripheral end face 13. The outer peripheral end face 12 has a side wall face 12a and chamfered faces 12b and 12b on both sides of the side wall face 12a, each between the side wall face 12a and the corresponding main surface 11. The inner peripheral end face 13 also has the same shape.

This invention also provides a method of manufacturing a magnetic disk using the magnetic disk glass substrate described above. In this invention, the magnetic disk is manufactured by forming at least a magnetic layer on the magnetic disk glass substrate according to this invention. As a material of the magnetic layer, use can be made of a hexagonal-system CoCrPt-based or CoPt-based ferromagnetic alloy with a large anisotropic magnetic field. The magnetic layer is preferably formed on the glass substrate by a sputtering method, for example, a DC magnetron sputtering method. By interposing an underlayer between the glass substrate and the magnetic layer, it is possible to control the orientation direction and size of magnetic particles in the magnetic layer. For example, using a hexagonal-system underlayer containing Ru and Ti, it is possible to orient the easy magnetization direction of the magnetic layer along the normal of the plane of the magnetic disk. In this case, the magnetic disk of the perpendicular magnetic recording type is manufactured. The underlayer can be formed by the sputtering method like the magnetic layer.

It is preferable to form a protective layer and a lubricating layer in this order on the magnetic layer. As the protective layer, it is preferable to use an amorphous hydrogenated carbon-based protective layer. The protective layer can be formed, for example, by a plasma CVD method. As the lubricating layer, use can be made of a lubricant having a functional group at the ends of the main chain of a perfluoropolyether compound. Preferably, the lubricant is composed mainly of a perfluoropolyether compound having at its ends a hydroxyl group as a polar functional group. The lubricating layer can be coated and formed by a dipping method.

Using the magnetic disk glass substrate obtained by this invention, the highly reliable magnetic disk can be obtained.

EXAMPLES

Hereinbelow, the embodiment of this invention will be described in detail with reference to Examples. This invention is not limited to the following Examples.

Example 1

A magnetic disk glass substrate of this Example was manufactured through (1) Rough Lapping Process (Rough Grinding Process), (2) Shaping Process, (3) Precision Lapping Process (Precision Grinding Process), (4) End Face Polishing Process, (5) Main Surface First Polishing Process, (6) Chemical Strengthening Process, and (7) Main Surface Second Polishing Process, which will be described hereinbelow.

(1) Rough Lapping Process

First, a disk-shaped glass substrate made of an aluminosilicate glass and having a diameter of 66 mm and a thickness of 1.0 mm was obtained from a molten glass by direct pressing using upper, lower, and drum molds. Alternatively, a plate glass may be manufactured by a downdraw method or a float method and then cut into a disk-shaped glass substrate with a predetermined size. As the aluminosilicate glass, use was made of a glass for chemical strengthening containing 58 wt % to 75 wt % $SiO_2$, 5 wt % to 23 wt % $Al_2O_3$, 3 wt % to 10 wt % $Li_2O$, and 4 wt % to 13 wt % $Na_2O$.

Then, a lapping process was applied to the glass substrate for improving the dimensional accuracy and shape accuracy thereof. This lapping process was carried out using a double-side lapping machine by the use of abrasive particles of particle size #400. Specifically, the glass substrate held by a carrier was placed in tight contact between upper and lower surface plates in the lapping machine and, then, by setting the load to about 100 kg and rotating a sun gear and an internal gear of the lapping machine, both main surfaces of the glass substrate received in the carrier were lapped to a surface accuracy of 0 to 1 μm and to a surface roughness (Rmax) of about 6 μm.

(2) Shaping Process

Then, using a cylindrical grindstone, a hole was formed at a central portion of the glass substrate. Then, grinding was applied to an outer peripheral end face to obtain an outer diameter of 65 mm and then predetermined chamfering was applied to the outer peripheral end face and an inner peripheral end face. In this event, the surface roughness of the end faces of the glass substrate was about 4 μm in Rmax. In general, a magnetic disk with an outer diameter of 65 mm is used in a 2.5-inch HDD (hard disk drive).

(3) Precision Lapping Process

Using a double-side lapping machine, this precision lapping process was carried out by placing the glass substrate, held by a carrier, in tight contact between upper and lower surface plates that were bonded with pellets containing diamond abrasive particles of particle size #1000 fixed with acrylic resin.

Specifically, by setting the load to about 100 kg and rotating a sun gear and an internal gear of the lapping machine, both main surfaces of the glass substrate received in the carrier were lapped to a surface roughness of about 2 μm in Rmax and about 0.2 μm in Ra.

The glass substrate having been subjected to the precision lapping process was immersed in respective cleaning baths (ultrasonic wave was applied) of neutral detergent and water in turn so as to be ultrasonically cleaned.

(4) End Face Polishing Process

Then, by brush polishing, the inner and outer peripheral end faces of the glass substrate were polished to a surface roughness of 1 μm in Rmax and about 0.3 μm in Ra while rotating the glass substrate. Then, the surfaces of the glass substrate having been subjected to the above-mentioned end face polishing were washed with water.

(5) Main Surface First Polishing Process

Then, a first polishing process for removing cracks or strains remaining in the above-mentioned lapping process was carried out using the double-side polishing machine shown in FIG. 3. In the double-side polishing machine, the glass substrate held by the carrier 4 is placed in tight contact between the upper and lower surface plates 5 and 6 each bonded with the polishing pad 7, the carrier 4 is brought into mesh with the sun gear 2 and the internal gear 3, and the glass substrate is pressed between the upper and lower surface plates 5 and 6. Then, by rotating the upper and lower surface plates 5 and 6 while supplying a polishing liquid between the polishing pads 7 and the polishing surfaces of the glass substrate, the glass substrate makes an orbital motion while rotating on its axis on the surface plates 5 and 6 so that both main surfaces of the glass substrate are polished simultaneously. Specifically, using a hard polisher (hard urethane foam) as a polisher, the first polishing process was carried out. The pH of the polishing liquid was adjusted to neutral by adding an ethanol-based low molecular weight surfactant to RO water in which 10 wt % cerium oxide (average particle size: 1 μm) was dispersed as a polishing abrasive. The load was set to 100 g/cm$^2$ and the polishing time was set to 15 minutes.

The glass substrate having been subjected to the first polishing process was immersed in respective cleaning baths of neutral detergent, pure water, pure water, IPA (isopropyl alcohol), and IPA (vapor drying) in turn so as to be ultrasonically cleaned and dried.

(6) Chemical Strengthening Process

Then, chemical strengthening was applied to the glass substrate having been subjected to the above-mentioned cleaning. The chemical strengthening was carried out by preparing a chemical strengthening solution in the form of a mixture of potassium nitrate and sodium nitrate, heating this chemical strengthening solution to 380° C., and immersing the cleaned and dried glass substrate in the chemical strengthening solution for about 4 hours. The glass substrate having been subjected to the chemical strengthening was immersed in respective cleaning baths of neutral detergent, pure water, pure water, IPA, and IPA (vapor drying) in turn so as to be ultrasonically cleaned and dried.

(7) Main Surface Second Polishing Process

Then, a second polishing process was carried out using the same double-side polishing machine used in the first polishing process while changing the polishing pads to soft-polisher (suede) polishing pads (polyurethane foam with Asker C hardness of 72). This second polishing process is a mirror polishing process for finishing the main surface of the glass substrate to a smooth mirror surface with a surface roughness of, for example, about 2 nm or less in Rmax while maintaining the flat surface obtained in the first polishing process. A polishing liquid used was adjusted to be acidic (pH=2) by adding 0.3 wt % Aron A-6016A (product name: manufactured by Toagosei Co., Ltd.) being an acrylic/sulfonic copolymer to RO water in which 15 wt % colloidal silica (average particle size: 15 nm) was dispersed as a polishing abrasive, and further adding sulfuric acid thereto. The friction coefficient between each polishing pad and the glass substrate calculated by the measurement method described using FIGS. 4A and 4B was adjusted to 0.032. The load was set to 100 g/cm$^2$ and the polishing time was set to 10 minutes.

The glass substrate having been subjected to the second polishing process was immersed in respective cleaning baths of neutral detergent, pure water, pure water, IPA, and IPA (vapor drying) in turn so as to be ultrasonically cleaned and dried.

The surface roughness of main surfaces of 100 glass substrates each obtained through the above-mentioned processes was measured using an atomic force microscope (AFM). As a result, the surface roughness was 0.137 nm in Ra, representing an ultra-smooth surface smoother than a conventional product. The surface roughness value is the average value of the manufactured 100 glass substrates and this also applies to the following Examples and Comparative Examples.

With respect to a scratch evaluation, the main surface of each glass substrate was observed (30 points) using an optical surface analyzer (OSA) and a detected surface defect was analyzed using an atomic force microscope (AFM). When, as a result of the AFM analysis, the number of points where the detected surface defect was confirmed to be a scratch was 10 or less out of 30 points, the scratches were judged as "few", while when it was greater than 10, the scratches were judged as "many".

The glass substrates each had an outer diameter of 65 mm, an inner diameter of 20 mm, and a thickness of 0.8 mm.

In this manner, the magnetic disk glass substrates of this Example were obtained. In Table 1 given later, the above-mentioned Ra value, a scratch evaluation, and a polishing rate value in the above-mentioned second polishing process are shown. According to this Example, while maintaining the high polishing rate, it is possible to obtain a magnetic disk glass substrate with less surface defects such as scratches than a conventional product so that it can be used as a next-generation substrate of which the requirement for the substrate surface quality is still stricter than the current requirement.

Example 2

The second polishing process was carried out in the same manner as in Example 1 except that the friction coefficient between each polishing pad and the glass substrate was adjusted to 0.038 using a polishing liquid added with 0.1 wt % Aron A-6016A. Magnetic disk glass substrates were obtained in the same manner as in Example 1 except for this second polishing process.

The surface roughness of main surfaces of the obtained 100 glass substrates was measured using an atomic force microscope (AFM). As a result, the surface roughness was 0.143 nm in Ra, representing an ultra-smooth surface smoother than a conventional product. Further, a scratch evaluation was carried out in the same manner as in Example 1.

In Table 1 given later, the above-mentioned Ra value, a scratch evaluation, and a polishing rate value in the above-mentioned second polishing process are shown. According to this Example, while maintaining the high polishing rate, it is possible to further reduce surface defects such as scratches as compared with a conventional product.

Example 3

The second polishing process was carried out in the same manner as in Example 1 except that the friction coefficient between each polishing pad and the glass substrate was adjusted to 0.048 using a polishing liquid added with 0.05 wt % Aron A-6016A. Magnetic disk glass substrates were obtained in the same manner as in Example 1 except for this second polishing process.

The surface roughness of main surfaces of the obtained 100 glass substrates was measured using an atomic force microscope (AFM). As a result, the surface roughness was 0.146 nm in Ra, representing an ultra-smooth surface smoother than a conventional product. Further, a scratch evaluation was carried out in the same manner as in Example 1.

In Table 1 given later, the above-mentioned Ra value, a scratch evaluation, and a polishing rate value in the above-mentioned second polishing process are shown. According to this Example, while maintaining the high polishing rate, it is possible to further reduce surface defects such as scratches as compared with a conventional product.

Example 4

The second polishing process was carried out in the same manner as in Example 1 except that the friction coefficient between each polishing pad and the glass substrate was adjusted to 0.025 using a polishing liquid added with 0.6 wt % Aron A-6016A. Magnetic disk glass substrates were obtained in the same manner as in Example 1 except for this second polishing process.

The surface roughness of main surfaces of the obtained 100 glass substrates was measured using an atomic force microscope (AFM). As a result, the surface roughness was 0.136 nm in Ra, representing an ultra-smooth surface smoother than a conventional product. Further, a scratch evaluation was carried out in the same manner as in Example 1.

In Table 1 given later, the above-mentioned Ra value, a scratch evaluation, and a polishing rate value in the above-mentioned second polishing process are shown. According to this Example, while maintaining the high polishing rate, it is possible to further reduce surface defects such as scratches as compared with a conventional product.

Example 5

The second polishing process was carried out in the same manner as in Example 1 except that the friction coefficient between each polishing pad and the glass substrate was adjusted to 0.021 using a polishing liquid added with 1.0 wt % Aron A-6016A. Magnetic disk glass substrates were obtained in the same manner as in Example 1 except for this second polishing process.

The surface roughness of main surfaces of the obtained 100 glass substrates was measured using an atomic force microscope (AFM). As a result, the surface roughness was 0.135 nm in Ra, representing an ultra-smooth surface smoother than a conventional product. Further, a scratch evaluation was carried out in the same manner as in Example 1.

In Table 1 given later, the above-mentioned Ra value, a scratch evaluation, and a polishing rate value in the above-mentioned second polishing process are shown. According to this Example, while maintaining the high polishing rate, it is possible to further reduce surface defects such as scratches as compared with a conventional product.

Comparative Example 1

The second polishing process was carried out in the same manner as in Example 1 except that the friction coefficient between each polishing pad and the glass substrate was adjusted to 0.015 using a polishing liquid added with 1.5 wt % Aron A-6016A. Magnetic disk glass substrates were obtained in the same manner as in Example 1 except for this second polishing process. A scratch evaluation was carried out in the same manner as in Example 1.

In Table 1 given later, an Ra value, a scratch evaluation, and a polishing rate value in the above-mentioned second polishing process are shown. According to this Comparative Example, while it is possible to reduce surface defects such as scratches, there is a problem that the polishing rate is largely lowered.

Comparative Example 2

The second polishing process was carried out in the same manner as in Example 1 except that the friction coefficient between each polishing pad and the glass substrate was adjusted to 0.061 without adding Aron A-6016A to a polishing liquid. Magnetic disk glass substrates were obtained in the same manner as in Example 1 except for this second polishing process. A scratch evaluation was carried out in the same manner as in Example 1.

In Table 1 given later, an Ra value, a scratch evaluation, and a polishing rate value in the above-mentioned second polishing process are shown. According to this Comparative Example, while the high polishing rate is obtained, the occurrence of surface defects such as scratches becomes significant. The obtained magnetic disk glass substrate is insufficient for use as a next-generation substrate of which the requirement for the substrate surface quality is still stricter than the current requirement.

TABLE 1

|  | Friction Coefficient | Aron A-6016A Addition Amount (wt %) | Ra (nm) | Scratch | Polishing Rate (μm/min) |
| --- | --- | --- | --- | --- | --- |
| Example 1 | 0.032 | 0.3 | 0.137 | few | 0.07 |
| Example 2 | 0.038 | 0.1 | 0.143 | few | 0.08 |
| Example 3 | 0.048 | 0.05 | 0.146 | few | 0.08 |
| Example 4 | 0.025 | 0.6 | 0.136 | few | 0.07 |
| Example 5 | 0.021 | 1.0 | 0.135 | few | 0.06 |
| Comparative Example 1 | 0.015 | 1.5 | 0.135 | few | 0.04 |
| Comparative Example 2 | 0.061 | non-added | 0.166 | many | 0.10 |

As is clear from the results in Table 1 given above, by adjusting the friction coefficient between the polishing pad and the glass substrate in polishing to the range of 0.02 to 0.05 in the polishing process as in the Examples of this invention, the ultra-smooth substrate surface (Ra≤0.150 nm) is obtained and, further, it is first possible to solve the trade-off problem between the reduction in surface defects such as scratches and maintaining the high polishing rate (polishing rate≥0.05).

Example 6

A magnetic disk for perpendicular magnetic recording was manufactured by applying the following film forming process to the magnetic disk glass substrate obtained in Example 1.

Specifically, an adhesive layer in the form of a Ti-based alloy thin film, a soft magnetic layer in the form of a CoTaZr alloy thin film, an underlayer in the form of a Ru thin film, a perpendicular magnetic recording layer in the form of a CoCrPt alloy thin film, a carbon protective layer, and a lubricating layer were laminated in this order on the glass substrate. The protective layer is for preventing degradation of the magnetic recording layer due to contact with a magnetic head and was made of hydrogenated carbon to obtain wear resistance. The lubricating layer was formed by a dipping method using an alcohol-modified perfluoropolyether liquid lubricant.

The obtained magnetic disk was incorporated into an HDD having a DFH head and was subjected to a one-month load/unload durability test while operating the DFH function in a high-temperature, high-humidity environment of 80° C. and 80% RH. As a result, no particular failure occurred and excellent results were obtained.

Further, magnetic disks for perpendicular magnetic recording were respectively manufactured in the same manner as described above, using the magnetic disk glass substrates obtained in Examples 2 to 5.

[DFH Touchdown Test]

With respect to each of the manufactured magnetic disks, a touchdown test of a DFH head element portion was conducted using an HDF tester (head/disk flyability tester) manufactured by Kubota Comps Corporation. This test gradually protrudes the head element portion using the DFH mechanism and, by detecting a contact with a magnetic disk surface using an AE sensor, evaluates the distance when the head element portion is brought into contact with the magnetic disk surface. The magnetic disk with a greater protruding amount enables a smaller magnetic spacing and thus is suitable for higher recording density, thereby allowing a magnetic signal to be accurately recorded/reproduced.

As the head, use was made of a DFH head adapted for a 320 GB/P magnetic disk (2.5-inch size). The flying height of a head body with no protrusion of the element portion is 10 nm. Other conditions were set as follows:

Evaluation Radius: 22 mm
Rotational Speed of Magnetic Disk: 5400 rpm
Temperature: 25° C.
Humidity: 60%

[Evaluation Criterion]

Evaluation was made in the following three levels according to the protruding amount of the head.

∘∘∘: 8.0 nm or more
∘∘: 7.0 nm or more and less than 8.0 nm
∘: less than 7.0 nm

The results are shown in Table 2 below.

TABLE 2

|  | Friction Coefficient | DFH Touchdown Test |
| --- | --- | --- |
| Example 1 | 0.032 | ∘∘ |
| Example 2 | 0.038 | ∘ |
| Example 3 | 0.048 | ∘ |
| Example 4 | 0.025 | ∘∘ |
| Example 5 | 0.021 | ∘∘ |

Examples 7 to 10

In each of Examples 7 to 10, the second polishing process was carried out in the same manner as in Example 1 except that the hardness of the polishing pads was changed to that shown in Table 3 below. Magnetic disk glass substrates (Examples 7 to 10) were obtained in the same manner as in Example 1 except for this second polishing process. In Example 9, use was made of the polyurethane foam polishing pads having an Asker C hardness of 80 and containing no ether group.

For the obtained glass substrates, a scratch evaluation was carried out in the same manner as in Example 1.

In Table 3 below, the above-mentioned scratch evaluations, and friction coefficients and polishing rate values in the second polishing process are shown.

Further, magnetic disks for perpendicular magnetic recording were respectively manufactured in the same manner as in Example 6, using the magnetic disk glass substrates obtained in Examples 7 to 10, and a DFH touchdown test was conducted. Evaluation results thereof are also shown in Table 3 below.

TABLE 3

| | Polishing Pad Asker C Hardness | Friction Coefficient | Scratch | Polishing Rate (µm/min) | DFH Touchdown Test |
|---|---|---|---|---|---|
| Example 7 | 75 | 0.030 | few | 0.08 | ∘∘ |
| Example 8 | 80 | 0.028 | few | 0.09 | ∘∘ |
| Example 9 | 80 (no ether group) | 0.023 | few | 0.09 | ∘∘∘ |
| Example 10 | 65 | 0.038 | few | 0.05 | ∘ |

As shown in Table 3, when the Asker C hardness of the polishing pad is 70 or more, a high polishing rate and an excellent result of the DFH touchdown test were obtained while occurrence of scratches was kept reduced, as compared with the case where the Asker C hardness is 65. As regards the DFH touchdown test, it is considered that the excellent result was obtained because microwaviness could further be reduced by the high Asker C hardness while occurrence of scratches was kept reduced by addition of the acrylic-based polymer containing the sulfonic group. The polishing rate was improved presumably because the high Asker C hardness makes it possible to efficiently press the abrasive particles onto the substrate. Further, by using a foamed polyurethane polishing pad containing no ether group, an especially excellent result of the DFH touchdown test was obtained.

Thus, by adding the acrylic-based polymer containing the sulfonic group to the polishing liquid, it is possible to utilize the polishing pad having a high Asker C hardness, which has previously been difficult to use in order to realize a substrate surface roughness as extremely small as 0.15 nm or less.

Example 11

A magnetic disk glass substrate and a magnetic disk were manufactured in the same manner as in Example 1 except that, in the second polishing process of Example 1, the above-mentioned friction coefficient between each polishing pad and the glass substrate was adjusted to fall within a range of 0.02 to 0.05 using a polishing liquid added with a polymer containing a sulfonic group instead of an acrylic/sulfonic copolymer. As the polymer containing the sulfonic group, a copolymer containing isoprene sulfonic acid as a monomer component was used.

For the obtained magnetic disk, the above-mentioned DFH touchdown test was conducted. As a consequence, an excellent result was obtained.

What is claimed is:

1. A method of manufacturing a glass substrate for a magnetic disk, comprising:
   a polishing step of polishing a main surface of a glass substrate by sandwiching the glass substrate between a pair of surface plates each having a polishing pad on a surface and by supplying a polishing liquid containing polishing abrasive particles between the glass substrate and the polishing pad,
   the abrasive particles being colloidal silica,
   the polishing liquid being added with a polymer containing a sulfonic group, and
   the polishing pad being a polyurethane polishing pad containing an ether group and an ester group and having a lower ether group content than an ester group content;
   wherein, in the polishing step, the polishing is carried out by using the polishing pad and the polishing liquid in which a concentration of the polymer is adjusted so that a friction coefficient falls in a range of 0.02 to 0.05 where the friction coefficient is a value obtained by dividing, by a load of 200 g, a frictional force which is measured when the glass substrate is fixed while the polishing pad is rocked in an in-plane direction of the glass substrate at 20 mm/sec in a state where the polishing pad is pressed with the load onto the main surface of the glass substrate and where the polishing liquid is supplied between the glass substrate and the polishing pad,
   wherein the polishing pad has as Asker C hardness of 70 or more,
   wherein a glass forming the glass substrate is an amorphous aluminosilicate glass,
   wherein the surface of the glass substrate after the polishing step has an arithmetic average roughness Ra of 0.15 nm or less,
   wherein a content of the polymer containing the sulfonic group in the polishing liquid is in a range of 0.01 to 1 wt %, and
   wherein a polishing rate in the polishing step is 0.05 µm/min or higher.

2. The method according to claim 1, wherein the friction coefficient is adjusted by adding the polymer containing the sulfonic group to the polishing liquid.

3. The method according to claim 1, wherein the polymer containing the sulfonic group is an acrylic-based polymer containing a sulfonic group.

4. The method according to claim 1, wherein the colloidal silica has a particle size of 10 to 40 nm.

5. The method according to claim 1, wherein a pad with one of a suede surface is used as the polishing pad.

6. The method according to claim 5, wherein a polishing pad with an Asker C hardness of 70 or more and 80 or less is used as the polishing pad.

7. A method of manufacturing a magnetic disk, comprising:
   forming at least a magnetic layer on the magnetic disk glass substrate obtained by the method according to claim 1.

8. The method according to claim 1, further comprising rotating at least one of said surface plates by a planetary gear.

9. A method of manufacturing a glass substrate for a magnetic disk, comprising:
   a pre-polishing step of preliminarily polishing a main surface of the glass substrate by a rough polishing;
   a polishing step of polishing said minor surface of the glass substrate by sandwiching the glass substrate between a pair of surface plates each having a polishing pad on a surface and by supplying a polishing liquid containing polishing abrasive particles between the glass substrate and the polishing pad, the abrasive particles being colloidal silica, the polishing liquid being added with a polymer containing a sulfonic group, and the polishing pad being a polyurethane polishing pad containing an ether group and an ester group and having a lower ether group content than an ester group content;

wherein, in the polishing step, the polishing is carried out by using the polishing pad and the polishing liquid in which a concentration of the polymer is adjusted so that a friction coefficient falls in a range of 0.02 to 0.05 where the friction coefficient is a value obtained by dividing, by a load of 200 g, a frictional force which is measured when the glass substrate is fixed while the polishing pad is rocked in an in-plane direction of the glass substrate at 20 mm/sec in a state where the polishing pad is pressed with the load onto the main surface of the glass substrate and where the polishing liquid is supplied between the glass substrate and the polishing pad, wherein the polishing pad has as Asker C hardness of 70 or more, wherein a glass forming the glass substrate is an amorphous aluminosilicate glass, and wherein the surface of the glass substrate after the polishing step has an arithmetic average roughness Ra of 0.15 nm or less, wherein a content of the polymer containing the sulfonic group in the polishing liquid is in a range of 0.01 to 1 wt %, and wherein a polishing rate in the polishing step is 0.05 µm/min or higher.

10. The method according to claim 9, wherein, when the main surface is preliminarily mirror-polished, the friction coefficient between the polishing pad and the glass substrate is adjusted to a range of 0.02 to 0.05.

11. The method according to claim 9, wherein in the rough polishing step, using a polishing liquid containing cerium oxide as a polisher.

* * * * *